Sept. 5, 1939.  T. THEODORSEN ET AL  2,172,333
SUSTAINING ROTOR FOR AIRCRAFT
Filed Aug. 25, 1936   9 Sheets-Sheet 1
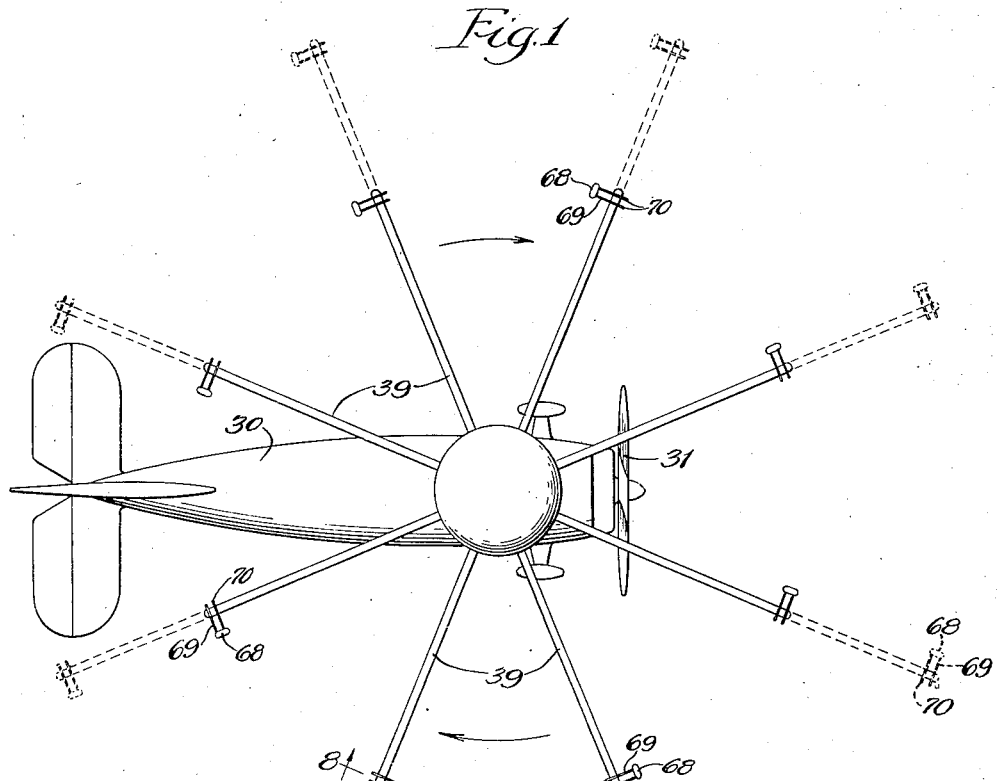
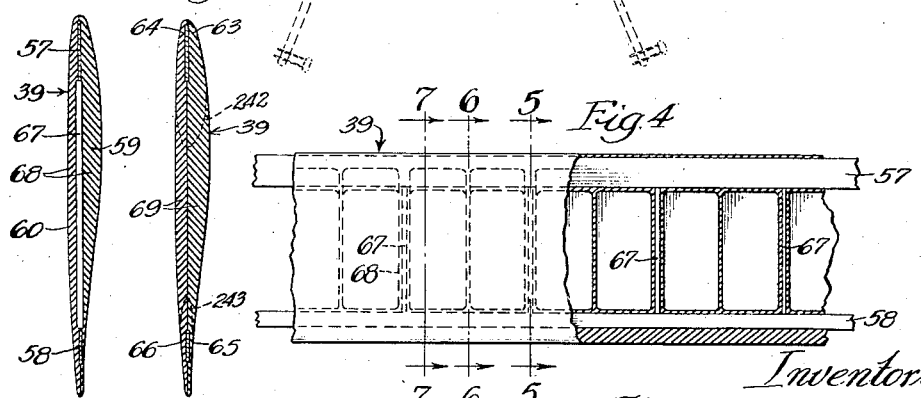
Inventors:
Theodore Theodorsen
and Edward F. Andrews,
By John F. Eakins.
Atty.

Sept. 5, 1939.    T. THEODORSEN ET AL    2,172,333
SUSTAINING ROTOR FOR AIRCRAFT
Filed Aug. 25, 1936    9 Sheets-Sheet 2
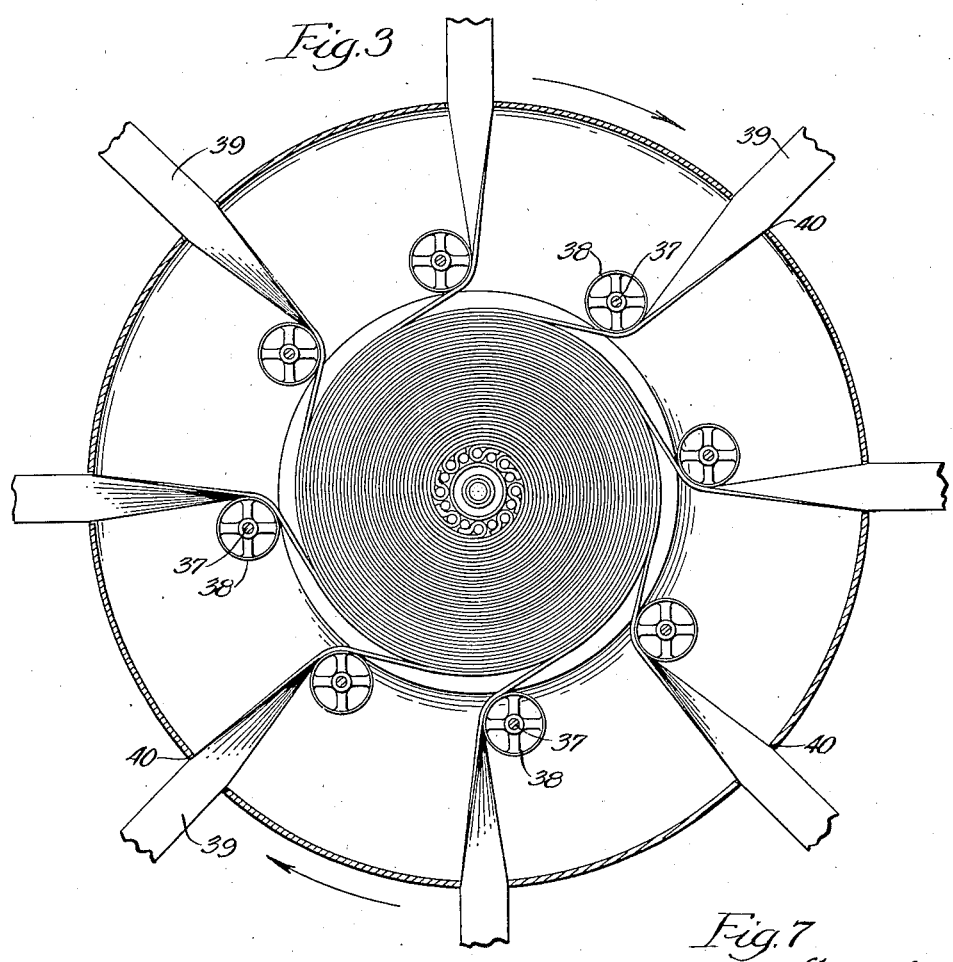
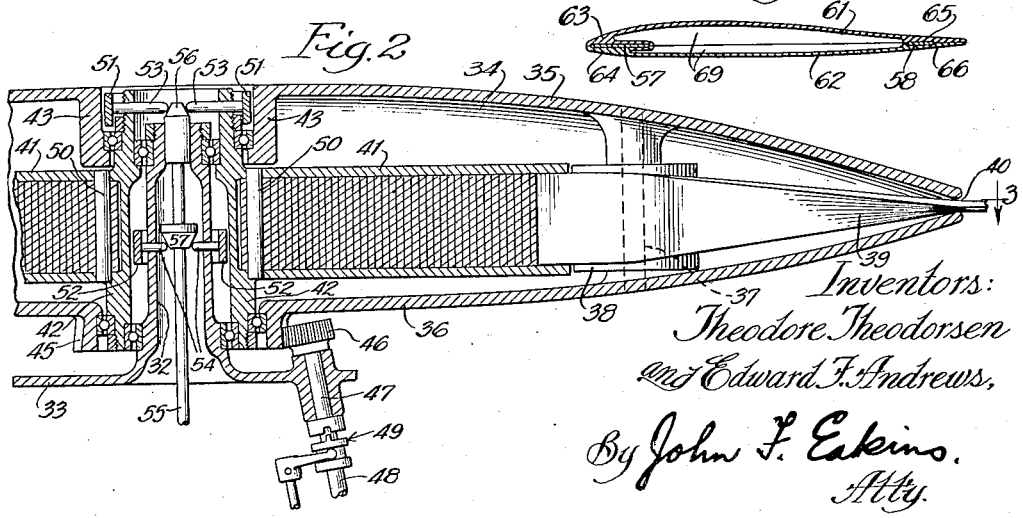
Inventors:
Theodore Theodorsen
and Edward F. Andrews,
By John F. Eakins.
Atty.

Sept. 5, 1939. T. THEODORSEN ET AL 2,172,333
SUSTAINING ROTOR FOR AIRCRAFT
Filed Aug. 25, 1936 9 Sheets-Sheet 3
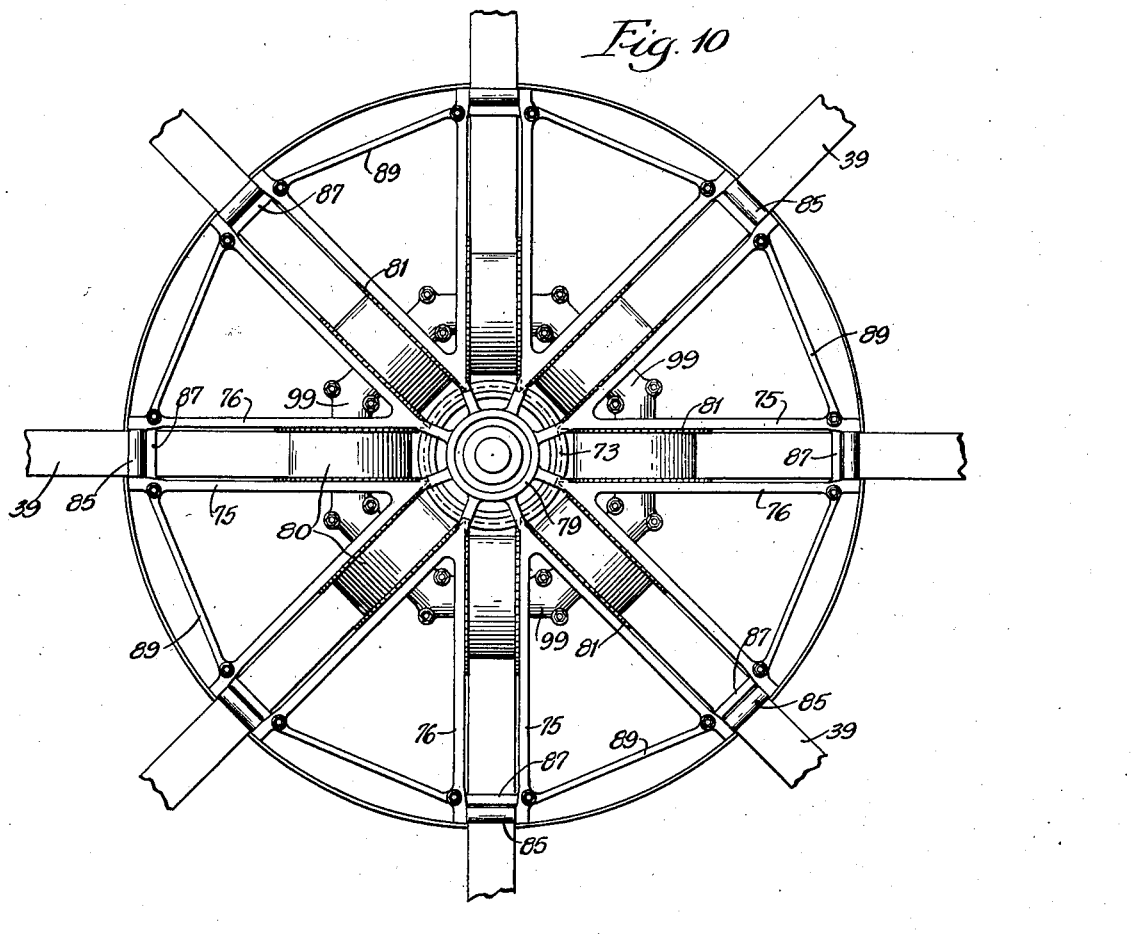
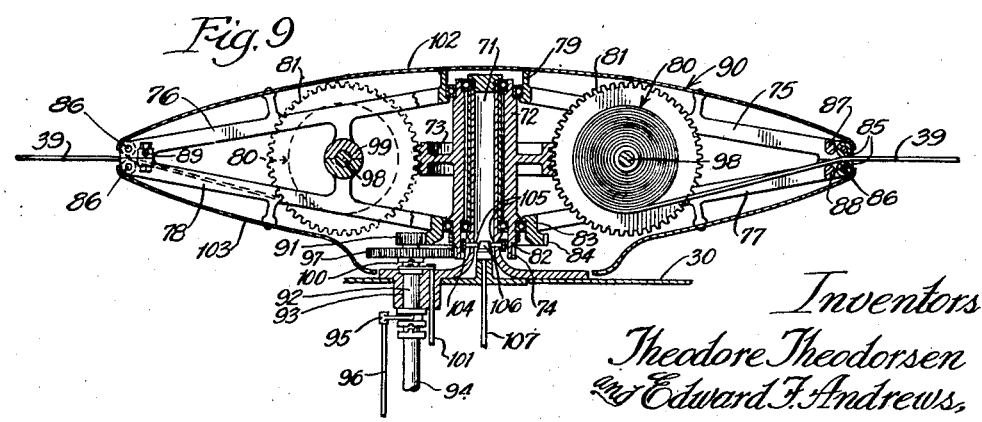
Inventors:
Theodore Theodorsen
and Edward F. Andrews,
By John F. Eakins
Atty.

Sept. 5, 1939.    T. THEODORSEN ET AL    2,172,333
SUSTAINING ROTOR FOR AIRCRAFT
Filed Aug. 25, 1936    9 Sheets-Sheet 4
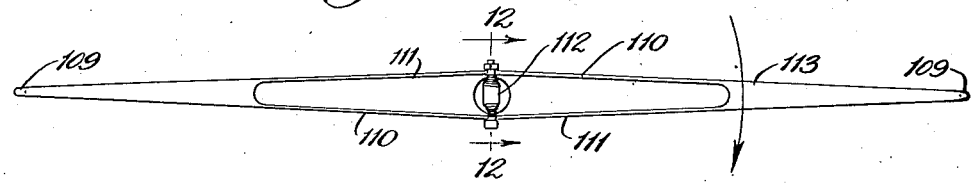
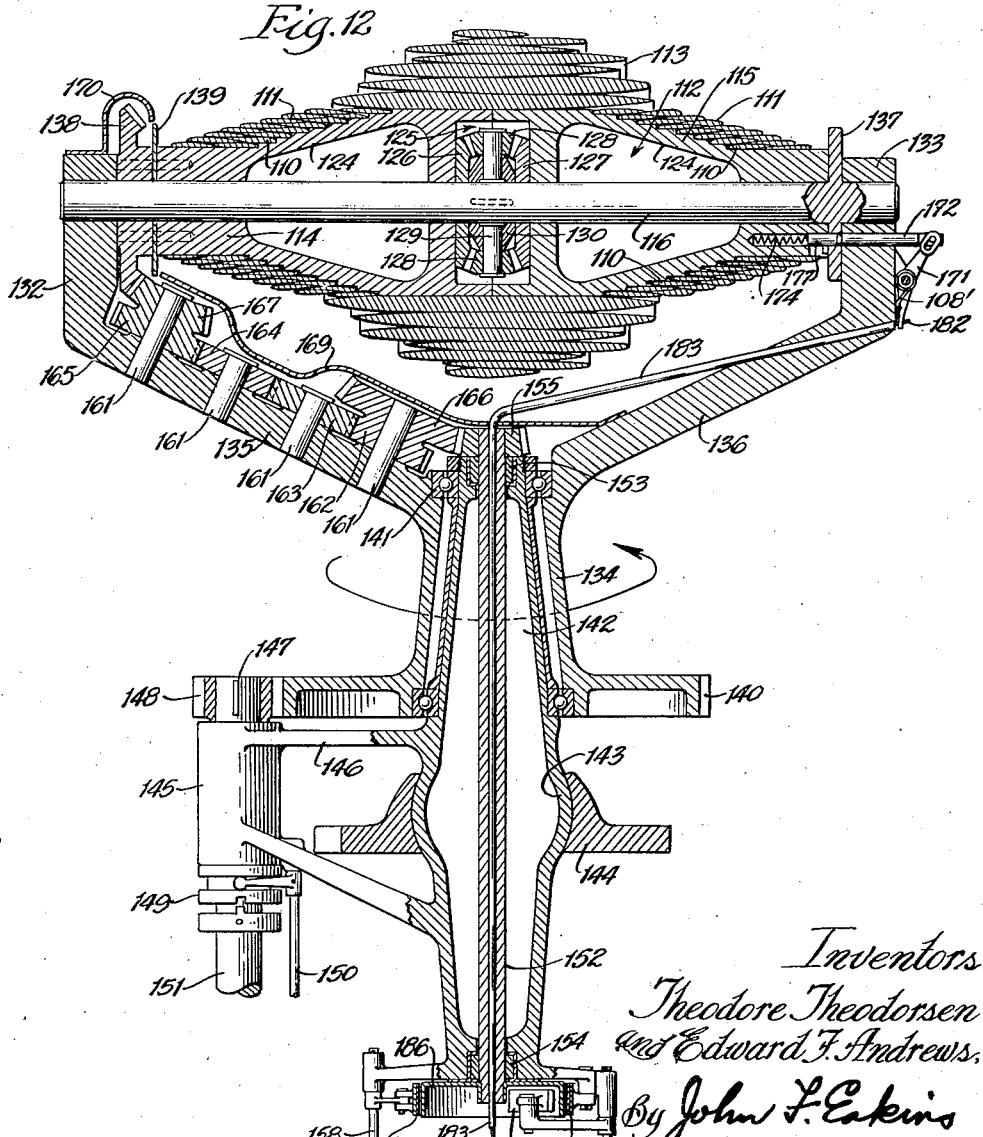
Inventors:
Theodore Theodorsen
and Edward F. Andrews,
By John F. Eakins
Atty.

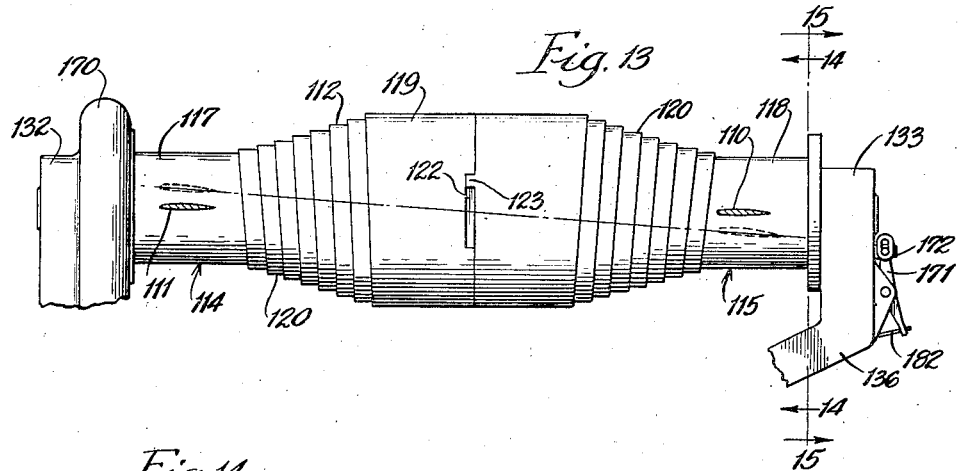
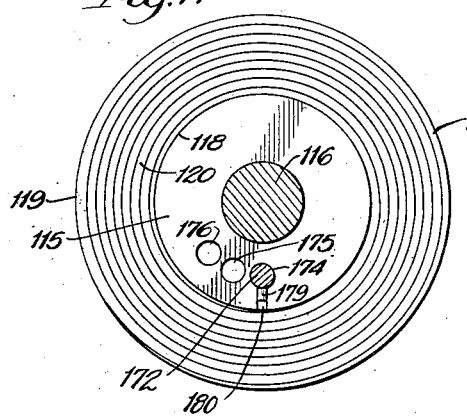
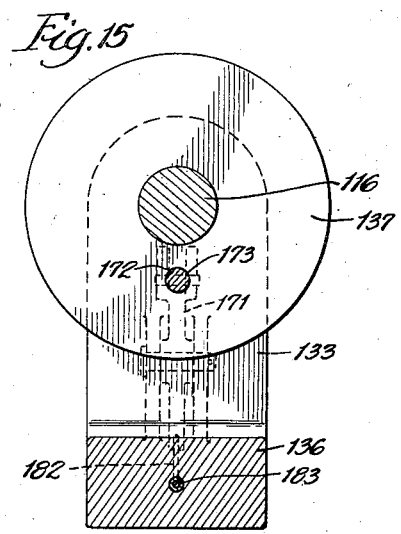
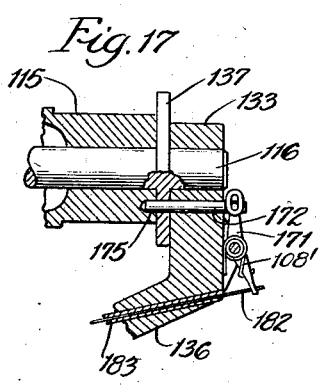
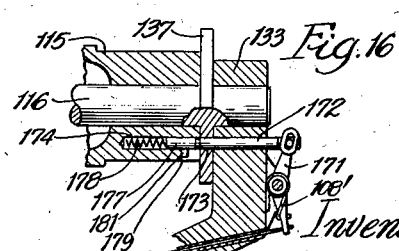

Sept. 5, 1939. T. THEODORSEN ET AL 2,172,333
SUSTAINING ROTOR FOR AIRCRAFT
Filed Aug. 25, 1936 9 Sheets-Sheet 6

Inventors:
Theodore Theodorsen
and Edward F. Andrews,
By John F. Eakins
Atty.

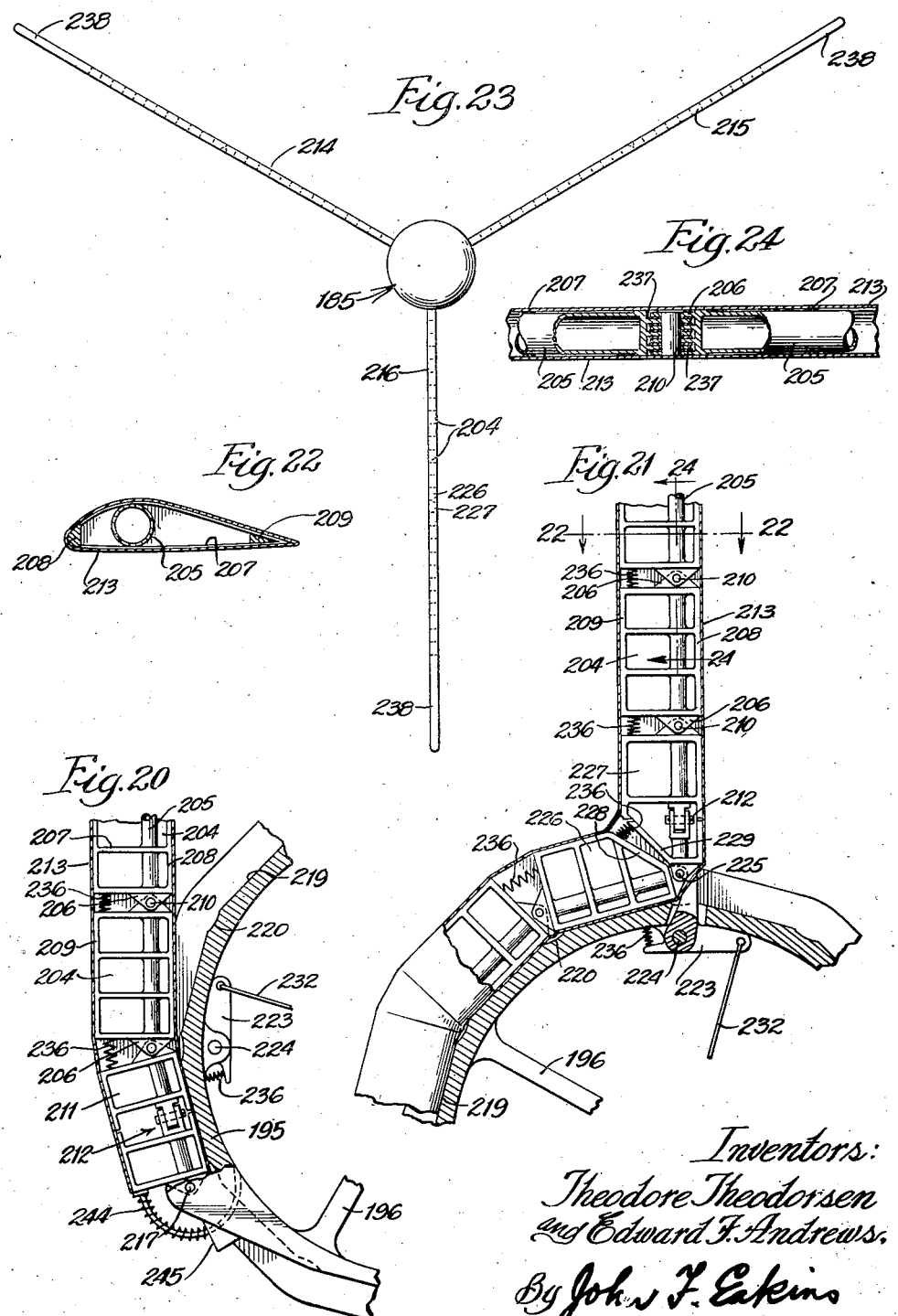

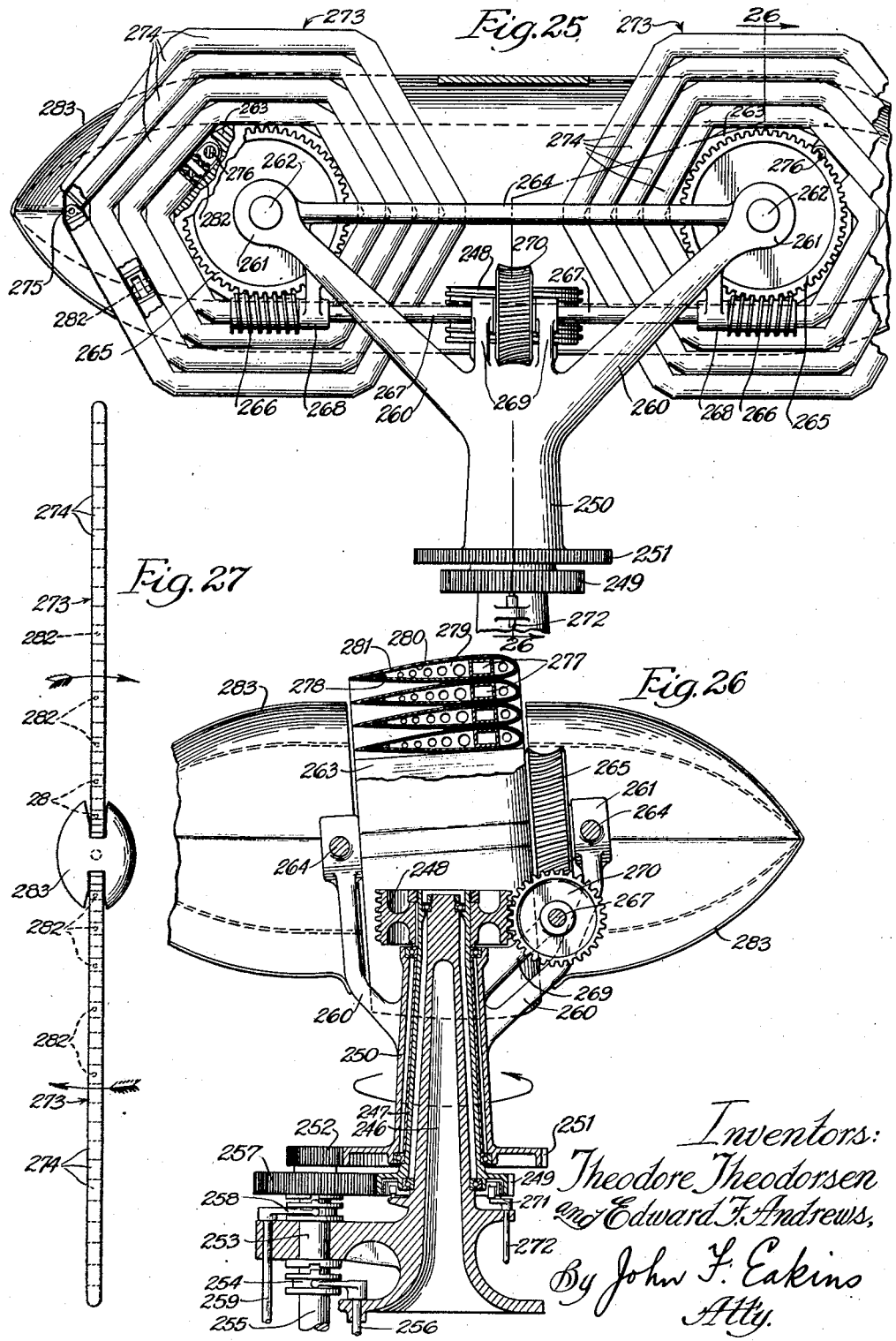

Sept. 5, 1939.   T. THEODORSEN ET AL   2,172,333
SUSTAINING ROTOR FOR AIRCRAFT
Filed Aug. 25, 1936   9 Sheets-Sheet 9
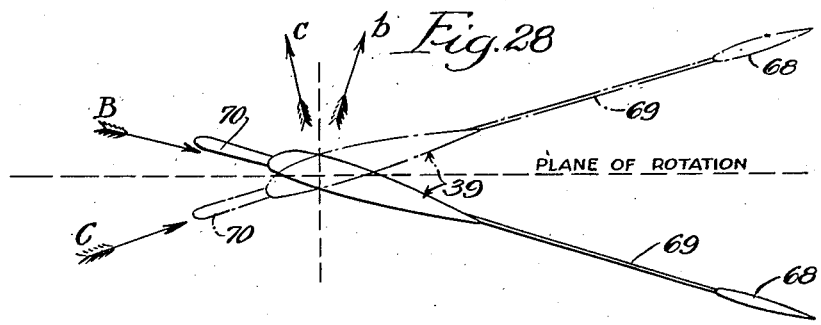
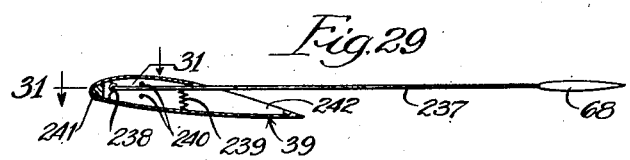
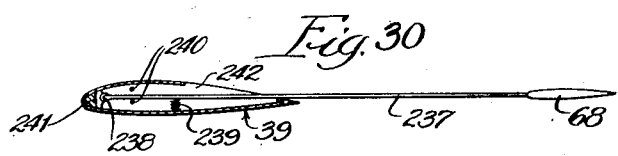
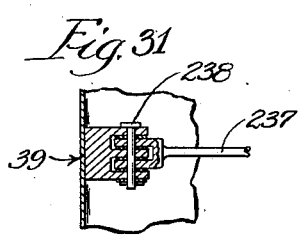
Inventors:
Theodore Theodorsen
and Edward F. Andrews,
By John F. Eakins.
Atty.

Patented Sept. 5, 1939

2,172,333

UNITED STATES PATENT OFFICE 2,172,333

SUSTAINING ROTOR FOR AIRCRAFT

Theodore Theodorsen, Hampton, Va., and Edward F. Andrews, Chicago, Ill.

Application August 25, 1936, Serial No. 97,804

41 Claims. (Cl. 244—18)

This invention relates to sustaining rotors for aircraft and particularly to rotors, the blades of which are flexible in at least one direction so that they may be wound up upon a drum for purposes of storage in compact compass, when out of operation or when only a part of the blades is being used.

The rotating wing systems of this invention may be driven by air forces, as in the autogyro, or may be power driven, as in the helicopter, and may utilize the inertia of their own rotation to effect the winding in of the lifting blades upon the drum.

Many highly desirable results are attained through the combined aerodynamic and mechanical characteristics of this invention. For sustaining large loads with small power, and for good climbing characteristics and slow speed flight, a large span of the lifting surface is desirable. In the case of aeroplanes having rigid wings, increase of span presents difficulties as the weight of a rigid span structure, subject mainly to bending stresses, goes up very rapidly with the span. With rotating blades, particularly if they are made highly flexible and damped so as to avoid natural resonances, the loads are principally tension loads, the bending loads being balanced by the centrifugal force which tends to hold the lifting surface perpendicular to its axis of rotation. With such a structure large spans may be employed without prohibitive weight. However, such a structure is self-sustaining only as long as it continues to rotate and will fall to the ground when its rotation ceases. To meet this condition we provide means for winding up the rotating flexible blades before they cease rotating. This feature has many other advantages which will hereinafter appear.

For high speed flight a much smaller span may be employed than for the low speed flight conditions previously referred to. It is advantageous to maintain the aspect ratio or the ratio of the disc area to the blade area reasonably high, and to reduce the span so as to improve the profile drag with relation to the induced drag for high speed flight.

To attain this result the rotating surfaces may be arranged so that their inner portions may be wound onto the drum and thus taken out of action while the outer portions of the lifting surfaces continue to function as rotating wings of smaller span and area. In this way the rotating wings may be varied in length while flying to meet either the requirements of high speed flight or of low speed and maximum climb.

Another advantage of the flexible construction, and the fact that the lift, or bending forces exerted upon the lifting surface, are balanced by the centrifugal force, is that only small spar depth is required for the wing and therefore it can be made of narrow chord and thin in section. This feature presents an advantage over a fixed wing aeroplane where, in many cases, the thickness of the wing is definitely determined by the depth of the spar required to resist the bending moments produced by the lift. It will, therefore, be seen that this invention provides greater latitude in the way of utilizing narrow chords and thin sections.

The possibility of greatly increasing the span of the lifting surface by means of this invention makes it applicable for the construction of large aircraft for carrying heavy loads, as with a large span a smaller expenditure of power is required to maintain the load in the air. Such large span aircraft, as well as other types constructed according to this invention, are not subjected to severe stresses due to the sudden changes of air forces produced by violent storms, etc., as are rigid wings of large span. The flexible and non-resonant character of the lifting surfaces permit them to yield and accommodate themselves to violent fluctuations in the air forces without damage, thus enhancing safety and dependability.

Other desirable characteristics, advantages and capabilities of the invention will appear from the following description of preferred embodiments thereof, taken in conjunction with the accompanying drawings, in which:

Fig. 1 is a plan view of an autogyro embodying our invention with an intermediate length of the blades extended, the full extension of the blades being shown in dotted lines;

Fig. 2 is a vertical sectional view through the blade storage drum and housing;

Fig. 3 is a sectional plan view, taken on line 3—3 of Fig. 2;

Fig. 4 is a fragmentary detail plan view of a portion of a blade; parts thereof being broken away to show the internal structure.

Fig. 5 is a transverse sectional detail view taken through a blade, the section being taken on line 5—5 of Fig. 4;

Fig. 6 is a transverse sectional detail view taken on line 6—6 of Fig. 4;

Fig. 7 is a transverse sectional detail view taken on line 7—7 of Fig. 4;

Fig. 8 is a sectional view taken on line 8—8 of Fig. 1, showing, on a larger scale, an air foil means for maintaining the desired angle of incidence of each blade with respect to its plane of rotation;

Fig. 9 is a vertical sectional view through a blade housing and retracting mechanism in a further embodiment of our invention;

Fig. 10 is a plan view of the structure shown in Fig. 9, the upper part of the housing being removed to show the interior construction;

Fig. 11 is a plan view showing a further embodiment of our invention;

Fig. 12 is a vertical sectional view taken on line 12—12 of Fig. 11, on a larger scale, showing the blades completely wound up on the drum;

Fig. 13 is a fragmentary view showing the drum in elevation;

Fig. 14 is a sectional detail view taken on line 14—14 of Fig. 13;

Fig. 15 is a sectional detail view taken on line 15—15 of Fig. 13;

Fig. 16 is a fragmentary sectional detail view, on a smaller scale, taken on line 16—16 of Fig. 15;

Fig. 17 is a similar view showing the parts in a different position of adjustment;

Fig. 20 is a fragmentary sectional detail view showing the construction of the blade and its manner of attachment to the drum;

Fig. 21 is a similar view showing the blade partially retracted for high speed flight;

Fig. 22 is a transverse section of the blade, shown in Figs. 18 to 21, the section being taken on line 22—22 of Fig. 21;

Fig. 23 is a plan view, on a smaller scale, of the complete rotor structure;

Fig. 24 is a sectional detail view taken on the line 24—24 of Fig. 21;

Fig. 25 is an elevational view of a further embodiment of our invention, with the blades wound up;

Fig. 26 is a sectional view therethrough, taken on the line 26—26 of Fig. 25;

Fig. 27 is a plan view thereof, on a reduced scale, showing the blades distended;

Fig. 28 is a diagrammatic view showing the position of the tail surface during helicopter and autogyro operation of the blade;

Fig. 29 is a similar view showing the relation of a modified tail surface under low speed conditions;

Fig. 30 is a similar view showing the relation of the modified tail surface under high velocity conditions; and Fig. 31 is a sectional detail taken on the line 31—31 of Fig. 29.

Figure 19:
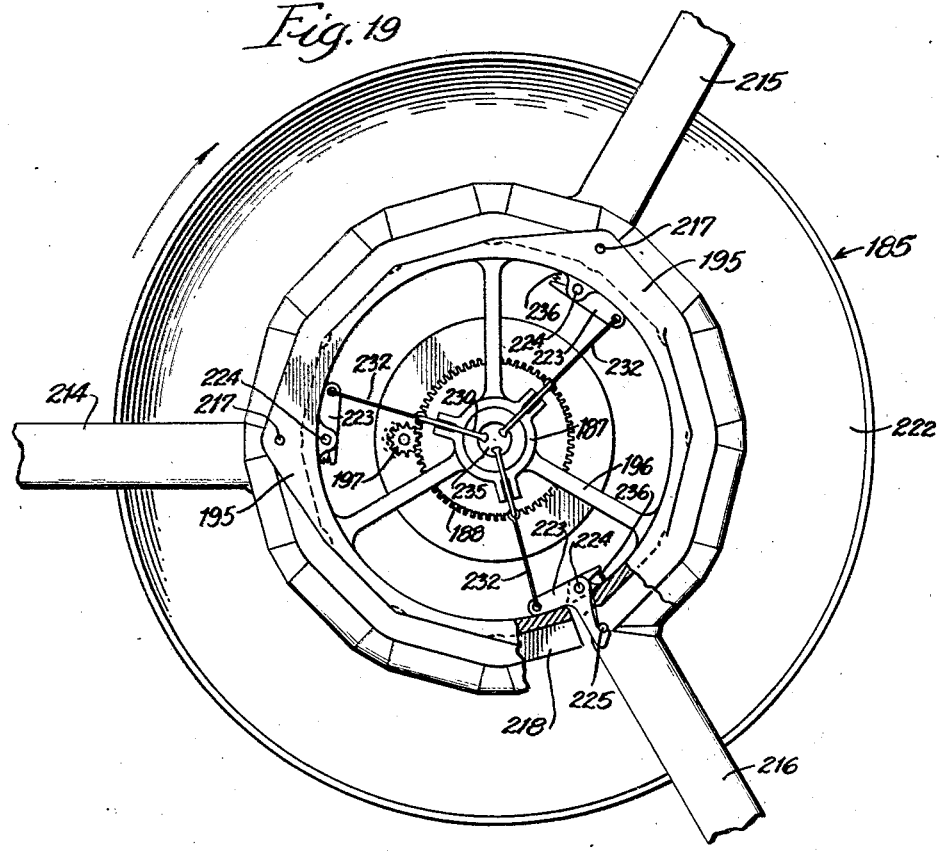
Fig. 19 is a plan view thereof with the upper portion of the housing removed to show the interior construction.

Referring to the accompanying drawings, and particularly to Figs. 1 to 8, the autogyro comprises a fuselage 30, propeller 31, and conventional landing gear and tail control surfaces. The complete rotor blade assembly rotates upon a hollow spindle 32, which is carried by a structure 33, at a sufficient height above the fuselage to prevent the blades from fouling any part of the machine. The flexible blades 39, are carried by a flanged drum 41, having a hub 42, adapted to rotate around spindle 32, with the aid of antifriction bearings interposed between the hub and spindle. The housing 34, shaped to obtain the minimum air resistance, consists of an upper member 35, having a centrally located downwardly projecting flange 43 and a lower member 36, provided on its under surface with a ring gear 45. The housing 34, with the aid of antifriction bearings, rotates freely around hub 42 of drum 41. A series of pulleys 38, circumferentially spaced around the periphery of drum 41, are free to rotate on shafts 37 carried by members 35 and 36 of housing 34. Slots 40, at the periphery of the housing 34, are provided for the passage of blades 39 into and out of the housing.

Each of the blades 39 is provided at the inner end with a loop whereby it is secured to the drum 41 by means of a bolt 50, each bolt passing through the loop of one of the blades 39.

A brake band 51 is carried by the hub 42 of drum 41 and is adapted, when expanded, to engage the flange 43 of the housing 34. A brake band 52 carried by the stationary hollow spindle 32 is adapted, when expanded, to engage the interior of the hub 42 of the drum 41. The brake band 51 carries rods 53 which project inwardly through the wall of the hub 42 at a position beyond the upper end of the spindle 32. The brake band 52, located at a lower position, is provided with rods 54 which project inwardly through the wall of the hollow spindle 32. Brake bands 51 and 52 are capable of being actuated alternately by means of a vertical shaft 55, which extends through the hollow spindle 32. This shaft carries conical cam surfaces which are oppositely directed. Thus, when the shaft 55 is projected upwardly the brake band 51 is expanded, locking drum 41 and housing 34 together. When thus locked together, the drum 41 and housing 34 rotate as a unit.

When, however, the shaft 55 is pulled downwardly, the brake band 51 is released, permitting housing 34 to rotate freely around hub 42 of the drum 41, and brake band 52 is expanded, thus locking drum 41 to the spindle 32 and holding the drum stationary. When rod 55 is in the intermediate position, neither brake 51 nor 52 is applied.

The housing 34 is driven by an engine through shaft 48. A clutch 49, adapted to be engaged or disengaged by the operator, connects the shaft 48 to shaft 47 which carries a pinion 46 in mesh with the ring gear 45 carried by housing 34.

The operation of extending the blades when they are fully wound up on drum 41 is as follows: The rod 55 is moved to its upper position, locking housing 34 to drum 41, and the clutch 49 is engaged so that the engine will drive housing 34. The direction of rotation, as viewed in Fig. 3, is clockwise. When housing 34 is rotating at the desired speed, the rod 55 is put in intermediate position, thus permitting the drum 41 to rotate independently of housing 34. The centrifugal force acting on blades 39 will then unwind them off the drum 41, the drum rotating at a higher speed than housing 34 while the unwinding continues. The rate at which the blades unwind from the drum may be controlled, by an upward pressure on rod 55, to restrain the rotation of the drum 41 relative to the housing 34. The blades may be permitted to unwind to their full extent or they may be stopped at any intermediate point by pushing upwardly on rod 55, thus locking drum 41 with housing 34. After the blades are unwound and the machine is in flight, the clutch 49 may be disengaged, whereupon the rotor blades will be driven by air forces.

To wind up the blades, clutch 49 being disengaged, rod 55 is pulled downwardly so as to lock drum 41 to spindle 32, thus keeping it stationary. Due to the inertia of the rotating blades they will continue to revolve, together with housing 34, around drum 41, thus winding themselves onto the drum. During flight the length of the blades may be reduced in this way to any desirable degree for the purpose of high speed operation and, when required, the length of the blades may again be increased for landing and low speed operation.

Preferably blades of short chord are employed and the housing 34 is made of thin section and of good streamline shape. The desired amount of blade area can then be obtained by providing a sufficient number of blades. By using blades of short chord the torsional load upon the blades is kept small. This embodiment of the invention permits the blade to be wound up with its chord parallel to the axis of rotation during operation and permits all the blades to be wound up on a single drum.

The construction of the blades 39 shown in this embodiment of the invention will now be described. The blade is of suitable air foil section, as shown in Figs. 5, 6 and 7. The blade is of a flexible structure and preferably comprises a flat cable 57 which may be of steel, in the leading edge of the air foil section and a similar cable 58 located near the trailing edge of the section. The air foil section may be formed by an upper member 59 and a lower member 60, both of which may be of molded rubber and fabric. Both sections comprise exterior skin portions 61 and 62 which merge at their forward and rear ends into substantial solid portions 63, 64, 65 and 66, respectively, within which portions the cables 57 and 58 are embedded. At intervals along the length of the blade rigid transverse spacing members 67 are provided which abut against the forward and rear cables 57 and 58. The spacers 67 are embedded within webs of rubber which extend between the skin portions 61 and 62. Between the spacers 67 the skin portion 61 and 62 are preferably provided with rubber webs 69 which register with each other and serve to preserve the air foil section of the blade. In assembling the blade, the metal portions 57, 58 and 67 are placed in the upper portion 59 within the formations provided for them. The lower section 60 is then placed over the upper section and the two sections are cemented or vulcanized together so as to provide a single unitary structure which is flexible in its span direction, but which is reinforced against distortion of its air foil section.

At the outer end each blade 39 is provided with a small air foil section 68 spaced a substantial distance rearwardly of the trailing edge of the blade and rigidly supported therefrom by means of streamlined booms 69. The forward ends 70 of booms 69 are enlarged and weighted to provide a concentrated weight at the end of the blade so that, under the action of centrifugal force, the blade will be in tension and take the lift properly. The air foil section 68 is fixed at an angle to the chord of blade 39 such that, with the air forces acting on air foil 68, the blade 39 will have the desired angle of incidence. The angle of incidence of the blade at the other end is determined by the angle of slot 40 relative to to the plane of rotation.

The weight 70 is so proportioned as to counterbalance the weight of the tail surface 68 so that the blade will not tend to twist under the influence of centrifugal force. In other words, the radius through the blade will coincide with the center of gravity of the whole tip unit, including weight 70, booms 69 and tail plane 68. The relative angle between the planes 39 and 68 establishes the angle of attack of the blade 39. This angle of attack will then tend to remain constant with relation to the relative air flow. If the aircraft sinks vertically the relative air flow will slant upwardly relative to a plane perpendicular to the axis of rotation. If the rotational speed of the blades increases, the angle of the relative air flow to this plane will become less, but the tail surface will tend, at all times, to maintain the same angle of attack of the blade 39 to its relative air flow.

The ends of the blades may be weighted in such a way that the centrifugal force exerted on the cables 57 and 58 may aid in resisting torsion. In the case of a normal air foil section where the center of pressure is nearer the forward than the trailing edge, we prefer to concentrate the weight nearer the forward edge. This may be done conveniently by associating a relatively large weight 242 (Fig. 6) with the forward cable 57 and a relatively smaller weight 243 with the trailing cable 58. The cable 57 may also be made heavier than the trailing cable 58 for the same purpose.

Figs. 9 and 10 illustrate a further embodiment of the invention. The blade retracting mechanism and housing are carried by a hollow spindle 71 attached to the fuselage in the manner described in the previous embodiment. A worm 73 having a hub 72 is rotatably mounted on the spindle 71 by means of anti-friction bearings. The hub 72 carries a downwardly projecting flange 82 provided with gear teeth 74. A series of flanged drums 80 having gear teeth 81 cut on their flanges are positioned radially around the worm gear 73 and mesh with it. The drums 80 rotate on shafts 98 in bearings 99 supported by the arms 75, 76, 77 and 78. The arms 75 and 76, one on each side of each drum 80, project radially from the hub 79. The arms 77 and 78 are similar and are rigidly secured to the lower hub 83, which flange also carries a ring gear 84 at its lowermost end. At their outermost ends the arms 75, 76, 77 and 78 support shafts 86 on which rollers 85 are rotatably mounted. The adjacent outer ends of arms 75 and 76 are connected together by a transverse member 87 and the adjacent outer ends of arms 77 and 78 are connected by a similar member 88. Adjacent radial structures, each comprising the arms 75, 76, 77 and 78 and the members 87 and 88, are tied together by rods 89 which are located adjacent the periphery of the assembly. Each pair of rollers 85 determines the angle of incidence of the blade 39 which projects therebetween, these rollers being provided with a small angle relative to the plane of rotation of the blade housing.

The arms 75 and 76, 77 and 78, the hubs 79 and 83 and the members 87, 88 and 89 form a unit 90 which is rotatably mounted on hub 72 by means of anti-friction bearings. This unit carries the drums 80 and the rollers 85. The driving of the unit 90 is accomplished by pinion 91 meshing with gear 84. Pinion 91 is mounted on the shaft 92 which is rotatably mounted in a bearing 93 supported in the base of the hollow spindle 71. A shaft 94, driven by an engine, drives shaft 92 through a disengaging clutch 95, which clutch is operated by a rod 96. A gear 97 is also mounted on shaft 92 and is free to rotate thereon. This gear meshes with the gear teeth 74 on hub 72. A clutch 100, operated by a rod 101 is provided for locking the gear 87 to shaft 92. The pinion 91 is smaller than the gear 83, and the gear 87 is larger than the gear 74. Thus, it will be seen that when the clutches 95 and 100 are engaged, both the unit 90 and the hub 72 carrying worm 73 will rotate, and the worm will rotate at a speed higher than the unit 90.

The rotating unit 90 is enclosed in a housing comprising an upper casing member 102 and a lower casing member 103, the casing members being formed to present the minimum air resistance. The housing thus formed leaves openings in alignment with the bite of the rollers 85 for the extension of the blades 39 out of the housing.

An expanding brake band 104 is carried by the spindle 71, and is adapted when expanded to engage the inner surface of flange 82 on hub 72. The brake band 104 carries rods 105 projecting inwardly into the interior of spindle 71 and these rods are adapted to be engaged by a conical cam 106. The cam 106 is carried on the upper end of a rod 107 and is operated by axial movement of this rod. When the rod 107 is in its lowermost position, the hub 72 is free to rotate around the spindle 71. When, however, rod 107 is pushed upwardly, the brake band 104 is expanded against the inner surface of the flange 82, thus locking the hub 72 to the spindle 71 and holding it against rotation.

The blades 39 are similar to those shown in Figs. 4, 5, 6 and 7, and each blade is fastened to the hub of one of the drums 80. If the blades are in the fully retracted position they are projected outwardly in the following manner: The clutch 100 is disengaged and clutch 95 is engaged and the shaft 94 is driven. The hub 72 and worm 73 are caused to rotate, and the rotating unit 90 and its housing being free to rotate, are put into rotation by the worm 73. The clutch 100 is then engaged, thus locking gear 91 to shaft 92. The hub 72 and worm 73, and the rotating unit 90 are now being driven directed in the same direction, but the hub 72 is driven at a considerably higher speed than the unit 90. Thus, there is relative rotation between the worm 73 and the drums 80, with the result that these drums are rotated on their shafts 88 and the blades 39 are unwound. The blades may be permitted to unwind until they are completely extended or may be stopped at any intermediate position by disengaging the clutch 100. Owing to the non-reversible drive between the worm 73 and the drum gears 81 there is no risk of the blades extending further after the clutch 100 is disengaged. To retract the blades the clutch 100 must be disengaged. The rod 107 is then pushed upwardly, thus locking hub 72 and worm 73 to the spindle 71 and holding the worm stationary. The unit 90 continues to rotate, either due to inertia of the rotating system or by power drive through pinion 91. Thus the drums 80 rotate about the stationary worm 73 and are caused to rotate their shafts 88 in the direction for winding up the blades 39.

It will, of course, be understood that any suitable number of blades and drums may be provided. This embodiment of the invention provides a very positive control of the winding and unwinding of the blades. Each blade is carried on an individual drum and unwinds exactly the same amount as each other blade at any time, so that the exact balance of the rotating system will be maintained when the blades are only partially projected for high or intermediate speed travel.

Figs. 11 to 17 inclusive illustrate a further embodiment of our invention. In this construction a two-bladed rotor is provided which is wound up on a single horizontal drum 112. Each blade consists of two cables 110 and 111 attached to the outer ends of the drum 112 and converging at their outer ends. Between the outer portions of cables 110 and 111 a solid air foil section 113 is formed of a flexible material such as rubberized fabric with suitable stiffening members. The cables 110 and 111, supporting the air foil sections 113, are also of air foil section and consist of steel wire cores covered with a suitable flexible material to give them the desired air foil shape. If desired, the air foil section 113 may be made longer and may extend inwardly to a point close to the drum 112. The drum is, of course, formed to receive it.

At their outer ends the blades 113 carry weights 109 attached to the end of cables 110 and 111. The comparatively wide spacing of the cables 110 and 111 and the separation of their points of attachment to the drum from each other and from the axis of rotation operate to keep the section at the proper angle and to resist any tendency of the blade to twist or curve during operation. These features also aid materially in maintaining the blades in radial relation if they are power driven from the hub as in helicopter operation.

The drum 112 is composed of two parts 114 and 115 carried on a shaft 116 and free to rotate thereon. As best seen in Figs. 13 and 14, the adjacent portions of the parts 114 and 115 of the drum 112 are enlarged, as shown at 119, and their remote end portions are reduced as shown at 117 and 118. The surface of the drum 112, between the enlarged central portion 119 and the reduced end portions 117 and 118, consists of spirals 120 which start at the small diameter ends 117 and 118 of the drum and travel longitudinally towards the center of the drum to the large diameter 119. The purpose of the spirals 120 is best illustrated in Fig. 12, where the blades are shown fully wound up. It will be seen that the cables 110 and 111 wind up on the spirals 120 the drum 112, with the cable 110 of one blade and the cable 111 of the other blade overlapping. The wing section 13 winds up on the cylindrical central portion 119 of the drum in the manner shown. In this manner the blades are wound up in the smallest compass and are positively supported on the drum along their entire length. It will be understood that during flight the blades are completely unwound and that the drum itself presents relatively little air resistance.

At their adjacent ends the drum parts 114 and 115 are provided respectively with a recess 122 and projections 123 extending thereinto. Thus these parts 114 and 115 may rotate independently of each other to a limited extent; but when rotated to that extent, the projection will come into contact with an end of the recess 122 and the drum will turn as a whole with shaft 116. To reduce the weight of the drum 112 the parts 114 and 115 are made hollow, as shown at 124. The adjacent ends of the drum parts 114 and 115 are recessed, as shown in Fig. 12. Within these recesses opposed bevel gears 126 and 127 are rigidly secured to the drum parts 114 and 115 respectively. Bevel pinions 128 are interposed between bevel gears 126 and 127 and mesh therewith. An annular ring 130 is rigidly mounted on the shaft 116 between the gears 126 and 127. The ring 130 carries radially projecting stub shafts 129 upon which the pinions 128 are rotatably mounted. If the shaft 116 is locked in a stationary position and the drum part 114 is rotated in one direction, the drum part 115 will rotate in the opposite direction. If the shaft 116 is locked to the drum part 115, then rotation of drum part 114 will cause both hubs to rotate in the same direction as a unit.

The shaft 116 is carried by bearings 132 and 133 supported from a hub 134 by arms 135 and 136. The shaft 111 is free to rotate within the bearings 132 and 133, and rigidly carries a disc 137 which is positioned between the end of drum part 115 and the bearing 133. A bevel gear 138 is rigidly mounted on the end of drum part 114 adjacent the bearing 132. A radially projecting guard disc 139 is carried on the end of drum part 114. The gear 138 and guard disc 139 are rigidly fixed to drum part 114 and rotate with it as a unit. The hub 134 carries a large spur gear 140 at its lowermost end and is rotatably mounted by means of anti-friction bearings 141, on a supporting spindle 142. The spindle 142 carries an enlarged spherical portion 143 below the gear 140. A socket member 144 encloses the spherical member 143 and is rigidly secured to the body of the aircraft. This ball and socket joint permits the operator to tilt the complete assembly in any direction for proper control of the aircraft.

The base of the spindle 142 rigidly carries projecting arms 146 above and below the socket member 144. These arms support a bearing in which a shaft 147 is rotatably supported. At its upper end the shaft 147 rigidly carries a pinion 148 which meshes with the ring gear 140. The lower end of shaft 147 carries a disengaging clutch 149, operable by a rod 150, and adapted to connect the shaft 147 to a drive shaft 151 which is driven from the engine. A central tubular shaft 152 is mounted for free rotation in the spindle 142 by means of anti-friction bearings 153 and 154. At its upper end the shaft 152 carries a bevel pinion 155 and at its lower end a brake drum 156. The end of the spindle member 142 adjacent the brake drum carries a contracting brake band 157 adapted to engage the outer surface of brake drum 156. The brake band is operable by rotation of a rod 158. The spindle 142 also carries a brake shoe 159 adapted to engage the inner surface of brake drum 156 and operable by rotation of a rod 160.

The arm 135 carries four spaced stub shafts 161. Upon these shafts are rotatably mounted gears 162, 163, 164 and 165 which mesh with each other in the order stated to constitute a gear train. The gear 162 is integral with a bevel gear 166 which meshes with the bevel gear 155. The gear 165 is integral with a bevel gear 167 which meshes with the bevel gear 138. Casing members 169 and 170 are provided to enclose the gear mechanism and may be shaped as desirable for minimum air resistance.

Now, with brake band 157 and brake shoe 159 in the released position, and the hub 134, together with its accompanying assembly, rotating in a clockwise direction as viewed from the top, the shaft 152 and brake drum 156 will also rotate at the same speed and drum 112 will remain stationary with respect to the hub 134 and supporting members 135 and 136. When, however, the brake band 157 is contracted and shaft 152 is locked in a stationary position, the continued rotation of the hub 134 and its assembly relative to the pinion 155 will operate through gears 166, 162, 163, 164, 165, 167 and 138 to rotate drum 112 about its axis in a counterclockwise direction, as viewed from the left in Figs. 12 and 13. When brake 157 is released and brake shoe 159 is operated, the effect is the same except that, due to the limited friction available by application of brake shoe 159, the shaft 152 and pinion 155 will continue to rotate, but at slower speed than the hub 134. In this case the drum 112 will rotate at a slower speed than with brake 157 applied. It will be seen that the brake shoe 159 can be dispensed with and the brake 157 utilized for the purpose by providing for light and heavy application of this brake.

A bell crank lever 171 is pivotally mounted on the supporting member 136 below the bearing 133. A locking pin 172 is slidably mounted in an opening in the arm 136, parallel to shaft 116. This pin is operatively connected to one end of the bell crank lever 171. The disc 137, which is integral with the shaft 131, is provided with an opening 173 which, at one point in the rotation of the disc permits the locking pin 172 to slide therethrough. A coil spring 108' yieldably forces pin 172 toward the disc 137. The end surface of drum part 115 adjacent the disc 137 is provided with a series of openings 174, 175 and 176, located in angular relation and equidistantly from the center of the drum. The openings 174, 175 and 176 are adapted to register with opening 173 in disc 137 as the drum part 115 rotates on the shaft 116. Within the opening 174 is slidably mounted a pin 177 which is yieldably pressed outwardly against the surface of the disc 137 by means of a spring 178 also located in the opening 174. The pin 177 carries a radially projecting stud 179 which operates in a slot 180 in the drum part 115. In one extreme position, as shown in Fig. 12, the stud 179 abuts against the surface of disc 137 and prevents the pin 177 from projecting beyond the disc. In its other extreme position, as shown in Fig. 16, the stud 179 abuts against the inner end 181 of the slot 180 and the pin 177 is prevented thereby from moving further into the drum part 115. The bell crank lever 171 is actuated by a flexible cable 182 operating in a casing 183. The cable 182 and its casing 183, extends through the arm 136 and the hollow shaft 152, and thence to a position convenient to the operator. In order to provide for the rotation of the casing 183 with the shaft 152, a swivel 184 is provided at the lower end of the flexible cable 182.

The supporting cables 110 and 111 of one blade are attached to drum parts 115 and 114 respectively, as shown in Fig. 13. The cables 110 and 111 of the opposite blade are attached in like manner to the opposite side of the drum parts 114 and 115 respectively.

The operation is as follows: As shown in Fig. 12, the blades are initially in their fully retracted position, being wound up on the drum 112. The cable 182 is pulled downwardly, retracting pin 172. The drum part 115 is then locked to the shaft 116 by the pin 177 projecting into opening 173 in disc 137. In this condition the drum 112, composed of parts 114 and 115, is adapted to rotate with shaft 116 as a unit. Brake band 157 and brake shoe 159 are in the released position. Shaft 151 is driven from an engine and clutch 149 is engaged, thus driving hub 134 and the drum assembly, in the clockwise direction as viewed in plan, through pinion 148 and gear 140. After hub 134 has attained a certain rate of rotation, the centrifugal force acting on the weights 109 at the tips of the wound up blades 113 will pull them off the drum 112. Drum 112 will rotate around its longitudinal axis, thus driving shaft 152, relative to the hub 134, through gear 138, pinion 155, and the gear train therebetween. This will continue until the blades are fully extended, when drum 112 will cease to rotate and shaft 152 will rotate with the hub 134. The rate at which the blades unwind may be controlled as desired by a partial application of the brake 157 or the brake shoe 159, which will retard the rotation of shaft 152 with a corresponding effect upon the rotation of drum 112. After the blades are fully extended the flexible cable 182 is released and spring 168' operates the bell crank lever 171 to move the locking rod 172, placing the parts as shown in Fig. 16, and so locking disc 137 and shaft 116 against rotation in bearings 132 and 133. At the same time the drum part 115 is unlocked from disc 137 and the drum parts 114 and 115 are free to rotate in opposite directions to a limited extent on the shaft 116. The brake shoe 159 is now applied by means of rod 160, placing a definite retarding effect on the shaft 152 and pinion 155 and thereby driving the drum part 114 in a counterclockwise direction, as viewed from the left of Fig. 12, and at a slow rate of speed. The drum part 114, rotating in a counterclockwise direction, drives drum part 115 in the opposite direction (counterclockwise as viewed in Fig. 14) through the gear assembly 125. This rotation continues until the opening 175, in the end of hub 115, registers with the locking pin 172, whereupon pin 172 will be forced into the opening 175 by the spring 168' as shown in Fig. 17, and the drum part 115 is locked in a stationary position. The shaft 116 being locked by the pin 172, the gear assembly 125 locks the drum part 114 against rotation. If the pin 172 is held out of the opening 175 and the action of the brake 159 is continued, the pin 172 may be caused to enter the opening 176 and lock the drum parts 114 and 115 in a different relation. Fig. 13 shows, in full lines, the position of cables 110 and 111 as attached to hubs 114 and 115 after the blades are fully extended and before the drum parts 114 and 115 have been moved relatively as above described. The cables 110 and 111 are shown in dotted lines in the position they occupy after the relative movement. It will be seen, in Fig. 13, that cable 110 is moved downwardly and cable 111 upwardly with respect to the axis of rotation. In this manner the wing section 113 is given the desired change in its angle of incidence. When pin 172 engages opening 176 in the drum part 115, the angle of incidence is maximum, and when the pin engages opening 175 an intermediate angle of incidence is secured. When pin 172 registers with pin 177 or opening 174 the angle of incidence is at a minimum or zero.

It is to be noted that the blade other than that shown in Fig. 13, having its cables 110 and 111 attached to the drum parts 114 and 115 respectively, is orientated in the same manner by the relative movement of the drum parts 114 and 115. When the pin 172 is withdrawn by the cable 182, the centrifugal force on the blades brings the drum parts 114 and 115 into initial relative position and the pin 177 automatically enters the opening 173 in the disc 137 and locks the drum parts to the shaft 116 in initial relative position.

Due to the possible angle change provided the angle best suited to slow speed, climb, high speed and either for autogyro or helicopter operation, may be selected. The displacement of the anchorages of the blades tends to change the angle of incidence of the entire lifting surface and hold it fixed with relation to the axis of rotation.

This construction is adapted to take off as a helicopter in the following manner: The blades are completely unwound and are rotated by the engine up to a speed higher than normal, the angle of incidence of the blades being at or near zero. The angle of incidence of the blades is then increased to the maximum in the manner described above. The increase of angle will cause a large increase in the lift, so that the momentum of the rotating system will raise the aircraft off the ground as a helicopter. After sufficient elevation is attained, the aircraft may be driven forward in usual manner and the blades may be allowed to function as autogyro blades. If it is desired to operate in this way, the opening 176 in the drum part 115 should be located remote from the opening 174 in order to provide a large angle of incidence for the helicopter operation of the blades. The opening 175 should be located to give a small angle of incidence so that the pin 172 may be entered thereinto, after the helicopter operation, to permit the blades to function as an autogyro.

Owing to the fact that the forward cable is connected to the rotating assembly at a substantial distance from the axis of rotation, the centrifugal force tends to resist torque to a substantial degree when power is applied continuously to the rotating assembly for permanent helicopter operation.

To retract the blades the flexible cable 182 is pulled downwardly, disengaging locking pin 172 from opening 175 or 176. The tension on the cables 110 and 111, due to centrifugal force acting on the blades, will rotate the drum parts 114 and 115 into their normal position and the pin 177 enters opening 173 in disc 137, as shown in Fig. 12. The brake 157 is applied by rotation of rod 158, thus locking shaft 152 and pinion 155 in a stationary position. As hub 134 continues to rotate, due to inertia of the rotating system or by power drive through shaft 151, drum 112 is rotated in a counterclockwise direction, as viewed from the left of Fig. 12, through gear 138 and 155 and the intermediate gear train, thus winding up the blades by the energy of their own momentum.

A further modification of our invention is illustrated in Figs. 18 to 24 inclusive. The rotating system 185 is supported on a tubular spindle 186 which is attached to the fuselage of an autogyro or helicopter and supported at a suitable height above it. A hub 187 is rotatably mounted on the spindle 186 by means of anti-friction bearings and at its lower end carries a flange 188. The flange 188 carries gear teeth 189 on its outer surface, and its inner surface is adapted to be engaged by an expanding brake band 190 carried by the spindle 186. The brake band 190 carries rods 191 which project inwardly into the interior of the spindle 186 and are adapted to be engaged by a conical cam 192. The cam 192 is carried on the upper end of a tubular operating member 193 adapted to move vertically in a bearing 194 carried by the base of the spindle 186. The hub 187 carries a threaded drum 195 by means of radial members 196. The rotating system is driven by a pinion 197 which meshes with the gear 189 carried by hub 187. The pinion 197 is carried on a shaft 198 mounted in a stationary bearing 199. A shaft 200, connecting at its lower end to an engine, furnishes power to shaft 198 through a clutch 201 operated by a rod 202, which clutch may be disengaged when desired.

Three rotor blades are shown in this embodiment of our invention. Each blade is composed of a plurality of sectional assemblies 204 placed end to end. Each section assembly 204 consists of a tubular member 205 carrying a pivot member 206 at each end. Each member 205 rigidly carries forming members 207, of desired air foil shape, at each end, and at suitable intervals therebetween. The forming members 207 are connected at their forward ends by members 208 forming a solid leading edge for the blade, and at the rear end they are connected by members 209 which form the trailing edge of the air foil. The sectional assemblies 204 are pivotally connected together by pins 210 passing through the pivot members 206 of each two adjacent assemblies. The sectional assembly 211 adjacent the point of attachment of the blade to the drum 195 comprises two parts connected together by a horizontal pivot 212 carried by the tubular members 205. Similar sections 211 may be placed at intervals along the blades, thereby giving the blade a degree of flexibility in a direction perpendicular to the plane of rotation of the blades. Pivot members 206 operating around pivot pins 210 provide the necessary degree of flexibility in the plane of rotation to permit the winding up of the blades on drum 195. The entire blade assembly is covered with a flexible material, such as elastic rubberized fabric, to form a casing 213 over the entire blade, which casing is fixed to sections 204 at a sufficient number of points to resist the action of centrifugal force tending to pull casing 213 off the blades.

The pivot joints between adjacent sectional assemblies 204 may be given a desired degree of damping by means of spring friction members. As seen in Fig. 24, the pivot members 206 of one section assembly 204 are interleaved with the pivot members of the adjacent section assembly, and frictional spring washers 237 are interposed between the pivot members to provide the damping.

The center of gravity and the elastic axis of the blade should substantially coincide and should be located close to the aerodynamic center of the air foil section of the blade, and the section should have a small center of pressure travel.

An advantage of this embodiment is that, although the blade has flexibility in the plane of rotation and perpendicular thereto, it nevertheless has considerable torsional stiffness which makes it possible to fix the angle of incidence of the blade relative to the axis of rotation. This results in a reduction of the effective angle of incidence on the side of the rotor traveling up wind and, therefore, having the greatest lift. This effect tends to equalize the lift on either side of the center of the span axis of the rotor. The sections and joints should be constructed so as to have the maximum torsional rigidity and tensile strength as these are substantially the main loads to which they are subjected.

Figure 18:
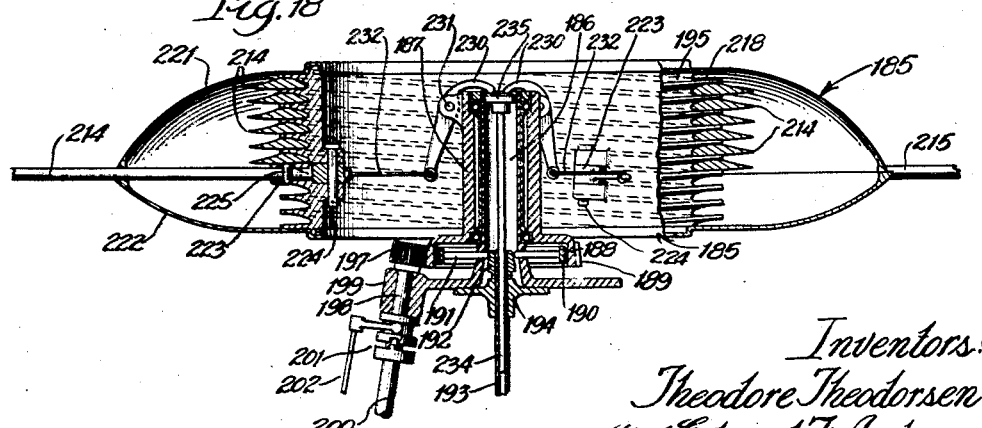
Fig. 18 is a vertical sectional view through the blade housing and drum of a further embodiment of our invention, the blades being shown partially retracted.

In the construction shown, three blades 214, 215 and 216 are attached to the drum 195 by means of pins 217. The outer surface of drum 195 is grooved in the form of a triple thread 218 beginning at the upper end of the drum and travelling downwardly. In this manner each blade is provided with an individual groove into which it may be wound. The grooves 218 are cut in the drum 195 in the shape of a polygon having sides 219. The length of the straight portions 219 of the polygon are of the correct length to accommodate one of the sectional assemblies 204 of the blades. The corners of the polygon are undercut as at 220 to accommodate any excess material of casing 213 due to the angle the adjacent blade section assemblies 204 assume when wound up in the grooves. As seen in Fig. 18, the grooves 218 are shaped to conform to the leading edges of the blades. Flexible casings 221 and 222 are provided to house the drum 195 and to minimize the air resistance of the rotating assembly 185. Upper casing member 221 is carried by the upper end of drum 195 and lower casing member 222 is carried by the lower end of the drum. The casings are so constructed that, as the blades travel vertically along the drum as they are wound or unwound, the outer edges of casings 221 and 222 will remain in resilient contact with the blades and follow them as they move up or down.

To unwind the blades from their fully retracted position the rotating assembly 185 is driven through pinion 197 by power shaft 200 through the clutch 201. The rotating assembly 185 will then be rotated in a clockwise direction as seen in Fig. 19 and the blades 214, 215 and 216 will be carried out and unwound off the drum by the action of centrifugal force. With the blades fully extended, high lift is realized which is suitable for take off, slow speed flight and landing. For high speed flight it is desirable to reduce the effective diameter of the rotor blades. For this purpose we provide latches 223, one for each blade, pivotally mounted on shafts 224 carried on the interior of the drum 195, at points corresponding to the desired projected length of the blades. The blades 214, 215 and 216 are partially wound up on drum 195 and the hooked ends of latches 223, which project through openings in the wall of the drum 195, engage a pivot pin 225 which projects slightly above and below the outer casing of the blade. The sectional blade assemblies 226 and 227 adjacent this pivot pin are constructed with forming members 228 and 229 at such an angle that the projecting part of the blade 203 may pivot around the pin 225 to a position nearly perpendicular to the blade section 226, as seen in Fig. 21. The sectional assembly 227 is provided with a vertical pivot 212 in the same manner as the assembly 211. Thus it will be noted that in either the fully extended or partially extended position of the blades a vertical pivot is provided close to the point of attachment of the blade to the drum. This is desirable in order to transfer the lift developed by the blades as directly as possible to the drum and to eliminate any undue bending strains on the blades.

Although only one set of latches 223 is shown here it will be understood that additional latches may be employed to provide additional operating positions of the blades. Also, similar latches may be provided for locking the blades in the fully wound up position for storage purposes. At the outer end of the blade a section of some length may be left unjointed. This part of the blade 238 can then be shaped into the most suitable air foil section for low drag at the comparatively high speed obtained at the tip of the blades.

The latches 223 are actuated by cranks 230 which are carried by the hub 187 on pivots 231. The cranks 230 are disposed radially around hub 187 and, at their lower ends, are connected to latches 223 by links 232. The upper ends 233 of cranks 230 project above the upper end of the hub 187 and are directed inwardly and downwardly into the interior of the spindle 186. An operating rod 234 is slidably mounted in the tubular member 193 and at its upper end it carries a cylindrical plug 235 adapted to engage the ends 233 of the cranks 230. Springs 236 hold latches 223 in latching engagement with the pins 225 on the blades. Centrifugal force, due to the rotation of drum 195, augments the action of the springs 236 to hold latches 223 in engagement with pins 225. Thus, when operating rod and plug 235 are in the downward position, the latches 223 will remain in engagement with pins 225. However, when rod 234 and plug 235 are actuated upwardly, latches 223 will be moved out of engagement with pins 225 and the blades will be permitted to unwind to their full extent.

When taking off, the clutch 201 is engaged and the rotor assembly 185 is rotated through the pinion 197 and the gear 199. The blades will unwind, if the rod 234 is in its lower position, to proper length for high speed operation or, if rod 234 is in its upper position, to their full extent for high lift and slow speed. The rate at which the blades unwind from the drum may be controlled by throttling the engine or by disengaging the clutch 201 and applying the brake 190. The rod 234 should be in the lower position. After the blades have been unwound to the high speed position, the clutch 201 is again engaged and the rotating system brought up to speed. Then clutch 201 is disengaged and rod 234 pushed upwardly, thus releasing the latches 223 and permitting the remainder of the blades to unwind, the brake 190 being applied as necessary to prevent the blades from unwinding too quickly. After the blades are fully unwound, the clutch 201 is again engaged and the blades brought up to speed. When the machine is in flight the clutch may be disengaged and the rotor blades driven by air forces. After the craft is in the air the length of the projecting blades is reduced to the high speed position by disengaging clutch 201 and applying brake 190 by an upward movement of the tubular member 193. This retards the rotation of drum 195 and causes the blades to wind themselves around the drum due to their own momentum. The rate at which the blades wind up on the drum may be controlled by varying the degree of application of the brake 190. When the blades are wound up to the point where latches 223 engage pins 225 in the blades, the brake 190 is released. At any desired time in flight the blades may be released to their full extent by merely moving the operating rod 234 upwardly, thus obtaining high lift for purposes of slow speed flight, climb, or landing.

Especially for helicopter operation we prefer to mount compression springs 236 between adjacent assemblies 204 near their trailing edges and to increase the damping of the hinge joints. We also provide springs 244 between the innermost assembly 211 and an abutment 245. The springs 236 and 244 aid materially in imparting yielding rigidity to the blades in the plane of their rotation and opposite to their direction of rotation, enabling them to resist a considerable torque applied at the hub when they are positively driven in helicopter operation. The springs 236 preferably decrease in strength outwardly from the hub. In unwinding the blade, these springs also oppose the straightening out of the blades and aid materially in preventing too rapid unwinding thereof. Conversely, the springs aid in winding the blades around the drum 195.

In the embodiment of the invention illustrated in Figs. 25 to 27 inclusive, the rotating assembly is mounted on a standard 246 rigidly mounted on the air craft in a generally perpendicular direction. A sleeve 247 is rotatably mounted on the standard 246 and carries at its upper end a worm 248 and at its lower end a gear 249. A sleeve 250 is rotatably mounted on the sleeve 247. At its lower end the sleeve 250 carries an annular gear 251 which meshes with a pinion 252 rigidly carried at the upper end of a shaft 253. The shaft 253 is rotatably supported in the base of the standard 246, and is adapted to be connected by a clutch 254 to a shaft 255 driven by the engine (not shown). The clutch 254 is adapted to be engaged and disengaged by a manually operated shaft 256.

A gear 257, which is freely mounted on the shaft 253, meshes with the gear 249. The gear shaft 257 may be clutched to the shaft 253 by a clutch 258, manually operable by rod 259.

The sleeve 250 is provided on opposite sides with upwardly diverging arms 260 which provide bearings 261 at their upper ends for freely rotating shafts 262 of drums 263. These shafts lie in a generally circumferential direction with respect to the axis of rotation, but they are deflected upwardly out of the horizontal in the direction of their travel by a small angle to impart the proper angle of incidence to the blade carried by their drums, as best seen in Fig. 26. The upper ends of the arms 260 at adjacent ends of the drums 263 are connected by tension members 264.

Adjacent ends of the drums 263 have rigidly mounted thereon worm gears 265 which mesh with oppositely directed worms 266 rigidly carried by a transverse shaft 267. The shaft 267 is rotatably supported near its ends in brackets 268 carried by the adjacent arms 260 and near its center by brackets 269 carried by the sleeve 250.

Between the brackets 269 the shaft 267 has rigidly mounted thereon a worm gear 270 in mesh with the worm 248. It will readily be understood that when the worm 248 drives the gear 270 in one direction, the drums 263 are driven in opposite directions, and that these directions may be reversed by reversing the relative rotation of the worm 248 with respect to the gear 270.

The gear 249 is recessed on its underside and a brake band 271 is mounted in the recess. The brake band 271 may be applied by a manually operated rod 272 so as to arrest or retard the rotation of the sleeve 247.

The drums 263 are preferably polygonal, for example, hexagonal shape as best shown in Fig. 25, and the blades 273 which are mounted thereon suitably consist of a series of rigid sections 274 pivotally connected together by transverse hinges 275. The blade sections 274 are arranged to fold up on the polygonal drums 263 and for this purpose the sections increase in length progressively in the outward direction of the blade, as best seen in Fig. 25. The innermost section 274 is secured to its drum 263 by a pin 276 which extends transversely with respect to the blade and in the axial direction of the drum 263.

Each section 274 may suitably comprise a torsionally rigid box member 277 and a trailing edge member 278 to which are rigidly secured forming members 279 of air foil section. The members 277, 278 and 279 are enclosed within a rigid shell 280, and all the sections of the blade 273 are enclosed within a flexible covering 281.

The innermost section 274 and several of the other sections, particularly some of those near the inner end of the blade, are made of two parts connected together by pivotal connections 282, the axes of which are generally parallel to the axis of rotation of the sleeve 250 when the blades are projected in the horizontal direction. The pivotal connections 282 are preferably high friction connections generally similar in effect to the pivotal connection shown in Fig. 24. The play in the joints 275 should be kept as low as practicable. The tension applied to the blade by centrifugal force aids materially in minimizing the effect of any play present.

In order to reduce air resistance we prefer to provide a streamlined housing 283 which may be supported on the arms 260. The housing 283 projects on either side beyond the drums 263. If the rotor is intended principally for high speed flight with the blades only partly extended, the housing should be arranged to enclose the portions of the blades remaining on the drums. The housing 283 shown in full lines in Fig. 25 is adapted for this purpose. If the rotor is intended for normal operation with the blades fully extended, the housing is preferably arranged to enclose the drums, as shown in dotted lines in Fig. 25.

The operation of this embodiment of the invention is as follows: The shaft 255 being driven by the engine, the clutch 256 is engaged and the rotatable system is brought up to a high speed. In the embodiment of the invention shown, the rotation is in the clockwise direction, as viewed in Fig. 27. The clutch 258 is then engaged and owing to the fact that the ratio between the gears 257 and 249 is higher than the ratio between the pinion 252 and the gear 251, the worm 248 is driven at a higher speed than the sleeve 250 and in the same direction. The worm 248 consequently drives the gear 270 and causes the drums 263 to rotate in opposite directions so as to feed out the blades from the top of the coil. The blades are held outwardly in the radial direction by centrifugal force. During the extension of the blades, power is supplied to the rotating system by the engine. When the blades are fully paid out the clutch 258 is disengaged and the engine is accelerated to impart flight speed to the rotor. When the rotor nearly sustains the weight of the aircraft, the clutch 254 is disengaged and the propeller of the aircraft is accelerated so as to move the aircraft forward so that it takes off. The rotor is then driven by the air forces in well known autogyro fashion. After speed is attained, the brake 271 is applied, with the result that the blades are drawn inwardly owing to the difference of rotation of the sleeves 247 and 250, and when the effective length of the blades is adjusted for high speed flight the brake 271 is released. The release of the brake 271 is effected at a time when one of the vertical pivots 282 is located near each drum. For low speed landing the blades may again be fully projected by engaging the clutch 258 for a suitable interval. The rotation of the system has the effect of rotating the worm 248 at a higher speed than the system through gears 251, 252, 257 and 249 to pay out the blades. Immediately after landing the brake 271 may be applied and the blades will wind up owing to their momentum, and the rotation of the sleeve 250 relative to the sleeve 247. The machine can then be taxied to any desired point in zero lift condition.

It will be noted that the worm drive is irreversible so that the drums are automatically locked in any position they may be in, and that positive actuation of the nature of differential movement between the sleeves 247 and 250 produced either by the engagement of the clutch 258 or the application of the brake 271 is necessary to change the extension of the blades.

It will be understood that in this embodiment of the invention, like in the other embodiments of the invention, the stationary mounting of the rotor, in this case the spindle 246, may be mounted for universal adjustment relative to the aircraft in the same manner as suggested in Fig. 12, for the purpose of balancing and steering the aircraft.

The tail plane 68 previously referred to has advantages in both autogyro and helicopter operation. Thus, referring to Fig. 28, the full line position of the blade 39 and tail 68 corresponds to helicopter operation in which power is applied to the blade. If the engine of the helicopter fails, the angle of the blades should be reduced so that the assembly may continue to rotate in the same direction, as an autogyro, to support the aircraft during descent. With blades having a considerable degree of torsional flexibility, say around their aerodynamic centers, and equipped with tail surfaces, this action may be made to take place automatically as follows: While the engine is supplying power to the blades, air is moved downwardly from above by the action of the lifting surfaces. The relative air flow over the lifting surface then slants downwardly. The tail plane 68, however, tends to preserve a certain angle of the lifting surface 39 with relation to the relative wind. Therefore, the lifting surface and the tail plane tend to assume a positive angle relative to a plan perpendicular to their axis of rotation, as shown at B (Fig. 28). The resultant force under these conditions slants backwardly with relation to the axis of rotation of the wing system, as shown at b. Under these conditions power must be applied to the rotating assembly to maintain the rotation of the wings and the aircraft supports itself as a helicopter. However, if the power is interrupted, the aircraft as a whole tends to settle toward the earth under the influence of gravity and the relative air flow slants upwardly relative to the plane of rotation, as shown at C. The lifting surface 39 and tail plane 68 maintain a similar angle to the relative air flow and assume the position shown in dotted lines in Fig. 28. The resultant force now slants forward with relation to the axis of rotation, as shown at c, and a force is present which will maintain rotation of the lifting surfaces in the same direction as when power was applied. Thus, the direction of the resultant force slants backwardly when power is applied and slants forwardly when the application of this power is interrupted, thus automatically maintaining the rotation of the lifting surfaces in the desired direction and assuring continued and efficient lift for safe descent with a dead motor.

In Figs. 29, 30 and 31, we illustrate an embodiment of the invention in which the tail plane 68 is pivotally mounted by means of rods 237 to the torsionally flexible blade 39, at a point 238 forward of its aerodynamic center at which the force rotating the wing system about its axis of rotation is regarded as being applied. At a point substantially behind the aerodynamic center the rods 237 are supported by the blade 39 by means of a compression spring 239 or other resilient means, tending to give the chord of the air foil a certain maximum angle with respect to the tail rods 237. The larger the air forces, the more the spring will be compressed and the more the chord of the lifting surface will tend to assume a position roughly parallel to the tail rods 237, as seen in Fig. 30. The relative motion between the blade 39 and the rods 237 may be limited by stops 240.

As the air forces increase with relative air speed, the angle of the lifting surface 39 when rotating around an axis which moves forward through the air will tend to flatten out on the upwind side, thus decreasing the lift, while on the downwind side the angle will increase, thereby tending to equalize the lift on the upwind and downwind sides of the axis of rotation.

A damping device should be included between the blade 39 and tail supporting rods 237 so that energy will be consumed when a displacement between these members occurs, thus tending to damp out undesired oscillations. This damping means may consist of a number of spring washers interposed between the pivot members on the blade 39 and on the forward ends of the rods 237.

The rods 237 may be pivoted to the interior of the blade 39 and may project therefrom through slots 242. The stops 240 and springs 239 are also preferably located within the blade 39. If desired, a weight 241 may be carried at or near the forward edge of the blade 39 to counterpoise the weight of the tail plane assembly.

Although the invention has been disclosed in connection with the specific details of preferred embodiments thereof, it must be understood that such details are not intended to be limitative of the invention except in so far as set forth in the accompanying claim.

We claim:

1. In an aircraft, a rotating wing system thereon, having a wing of airfoil section flexible in at least one direction, at least one drum permanently located adjacent the axis of rotation of the rotating wing system, around which said wing may be wound for compact storage, said wing being of stable section, having its center of gravity and elastic axis close to its aerodynamic center, and means for inherently damping said wing, said wing having its chord and thickness increasing from its tip towards its root whereby it is rendered inherently resistant to twisting around its spanwise torsional axis.

2. In an aircraft, a rotating wing system mounted thereon, having a plurality of flexible airfoil section wings, means at the inner ends of said wings around which they may be wound into compact coils for storage, and means including weight means adjacent the forward parts of the wings effective to locate the center of mass close to the aerodynamic center when the wings are extended, to prevent twisting thereof about their torsional axes.

3. In an aircraft, a revolvable drum mounted thereon, a plurality of airfoil section wings flexible in at least one direction mounted upon said drum, means for rotating said drum so that said wings will extend outwardly from said drum supported by centrifugal force and their own lift, means including weight means located adjacent the forward parts of the wings, bringing their centers of mass adjacent their aerodynamic centers, and means for winding up said wings in a coil around said drum for compact storage.

4. In an aircraft, a revolvable drum mounted thereon, with its axis in a generally vertical position, a plurality of airfoils fastened to said drum with their chords parallel to the axis of said drum, means revolvable with said drum for twisting said airfoils so that their chords are generally perpendicular to the axis of said drum at a short distance therefrom, means for preventing twisting of the extended wings around their torsional axes, and means for winding said airfoils up around said drum in a coil with their chords parallel to the axis of said drum for compact storage.

5. In an aircraft, a rotating wing system mounted thereon, said wing system comprising a plurality of flexible wing members held in position during rotation by centrifugal force and their own lift and tending to fall to the ground when rotation ceases, weight means external to and forward of the wing members for preventing twisting of said wing members about their torsional axes, means for winding said wing members into coils of small diameter operable before rotation ceases to support and store them while not rotating, and means for locking the wing members partly extended.

6. In an aircraft, a drum mounted thereon with its axis substantially horizontal, a plurality of airfoil section wings extending outwardly from said drum and flexible in at least one direction and comprising weight means external to and forward of the airfoil sections for preventing twisting of the wings around their torsional axes, means for rotating said drum in a plane generally parallel to its axis to cause said airfoils to rotate as a rotating wing system, and means to cause said drum to rotate on its own axis to wind said wings into a compact coil around said drum for storage.

7. In an aircraft, a drum mounted thereon with its axis substantially vertical, a plurality of grooves in the periphery of said drum constituting threads thereon, an air foil section wing flexible in at least one direction attached to the drum in each thread groove, means for rotating said drum around its axis to rotate said wings as a rotating wing system, and means for causing said wings to roll upon said drum, the front edge of each wing entering into and following each thread groove for compact storage.

8. In an aircraft, a drum mounted thereon with its axis substantially vertical, a plurality fo grooves in the periphery of said drum constituting threads thereon, an air foil section wing flexible in at least one direction attached to the drum in each thread groove, means for rotating said drum around its axis to rotate said wings as a rotating wing system, means for causing said wings to roll up on said drum, the front edge of each wing entering into and following each thread groove for compact storage, and means for maintaining said wings in at least one intermediate position partly wound up and partly extending.

9. In an aircraft, a plurality of air foils extending outward in a generally radial direction from a hub around which they rotate, each said air foil comprising a series of sections hingedly connected together, and rotatable means for winding said air foils into a coil by bending them relatively at said hinged connections for compact storage.

10. In an aircraft, a plurality of air foils consisting of a series of rigid sections, hinge means pivotally connecting the sections together so as to prevent relative torsional movement between adjacent sections, said airfoils extending outwardly in a generally radial direction from a central axis around which they rotate, and means for winding said air foils into a coil by bending them in a direction in which they are flexible for compact storage.

11. In an aircraft, a plurality of air foils extending outwardly in a general radial direction from a central axis around which they rotate, the chords of said air foils lying in the general direction of the plane of rotation, said air foils being flexible in the direction of their plane of rotation, and rotatable means for winding up said air foils in this direction into small compass for storage.

12. In an aircraft, a plurality of air foils extending outwardly in a general radial direction from a central axis around which they rotate, the chords of said air foils lying in the general direction of the plane of rotation, each said air foil comprising a series of sections pivoted together to provide flexibility in the direction of its plane of rotation, rotatable means for winding up the air foils in this direction into the form of compact helices, and power means for imparting torque to said air foils at a point substantially away from said central axis.

13. In an aircraft, a plurality of flexible air foils extending outwardly in a general radial direction from a central axis around which they rotate and adapted to be held extended by centrifugal force, the chords of said air foils lying in the general direction of the plane of rotation, said air foils having a measure of torsional flexibility around an axis in the vicinity of their aerodynamic centers, a rearwardly extending tail surface member attached to each of said air foils near its outer end, whereby the tail surface member increases the angle of the chord of said air foils to the plane of rotation when the relative air flow slants downwardly relative to the plane of rotation, and decreases the angle of the chord of said air foil relative to the plane of rotation when the relative wind slants upwardly relative to the plane of rotation.

14. In an aircraft, a plurality of air foils extending outwardly in a general radial direction from a central axis around which they rotate, the chords of said air foils lying in the general direction of the plane of rotation, rotatable means for winding said air foils into coils, said air foils having a measure of torsional flexibility around an axis in the vicinity of their aerodynamic centers, and tail surface members located behind and beyond said air foils and supported therefrom.

15. In an aircraft, a plurality of air foils extending outwardly in a general radial direction from a central axis around which they rotate, the chords of said air foils lying in the general direction of the plane of rotation, said air foils being capable of winding into a coil and having a measure of torsional flexibility around an axis in the vicinity of their aerodynamic centers, and tail surface members connected to said air foils so as to be dragged behind said air foils, the chords of said air foils lying in the general direction of their plane of rotation but being urged by said tail surface members to a position in which the resultant of the air forces on said air foils slants forward with relation to said central axis when the relative wind comes from below the plane of rotation, and to a position in which the resultant of the air forces slants backward with relation to the axis of rotation when the relative wind comes from above said plane of rotation.

16. In an aircraft, a plurality of air foils extending outwardly in a general radial direction from a central axis around which they rotate, the chords of said airfoils lying in the general direction of the plane of rotation, said air foils having a measure of torsional flexibility around an axis in the vicinity of their aerodynamic centers, and tail surface members connected to said air foils so as to be dragged behind said air foils, said tail surface members being pivotally attached to said air foils forward of the aerodynamic center of said air foils, means resiliently connecting said air foils to said tail members behind said aerodynamic centers so as to urge said air foils to assume a positive angle with said tail members.

17. In an aircraft, a plurality of air foils extending outwardly in a general radial direction from a central axis around which they rotate, the chords of said air foils lying in the general direction of the plane of rotation, said air foils having a measure of torsional flexibility around axes in the vicinity of their aerodynamic centers, tail surface members connected to said air foils so as to be dragged behind said air foils, means for pivotally connecting said tail members to said air foils forward of the aerodynamic centers of said air foils, and means resiliently connecting said tail members to said air foils behind said aerodynamic centers whereby said air foils are urged to assume a positive angle with said tail members, and means for frictionally damping the relative motion between said air foils and said tail members.

18. In an aircraft, a plurality of air foils extending outwardly in a general radial direction from a central axis around which they rotate, the chords of said air foils lying in the general direction of the plane of rotation, said air foils being flexible in the direction of their plane of rotation, power means for imparting torque to said air foils, and resilient means resisting the flexing of said air foils in a direction opposite to their direction of rotation.

19. In an aircraft, a plurality of air foils extending outward in a generally radial direction from a central member with which they rotate, each said air foil comprising a series of sections hingedly connected together, means for winding said air foils into a coil by bending them relatively at said hinged connections for compact storage, and means for frictionally damping the motion of one section relative to another section.

20. In an aircraft, a plurality of air foils extending outward in a generally radial direction from a central member with which they rotate, each said air foil comprising a series of sections hingedly connected together, means for winding said air foils into a coil by bending them relatively at said hinged connections for compact storage, means for frictionally damping the motion of one section relative to another section, and means for resisting the bending of said hinged connections in a direction opposite to the direction of their rotation.

21. In a aircraft, a plurality of air foils extending outward in a generally radial direction from a central member with which they rotate, each said air foil comprising a series of sections hingedly connected together, means for winding said air foils into a coil by bending them relatively at said hinged connections for compact storage, means for frictionally damping the motion of one section relative to another section, and resilient means associated with said hinged connections resisting bending in the direction opposite to the direction of rotation.

22. In an aircraft, a plurality of air foils extending outwardly in a generally radial direction from a central member with which they rotate, said air foils consisting of a series of sections hingedly connected together, means for winding said air foils into a coil by bending them at said hinged connections for compact storage, means for frictionally damping the motion of one section relative to another section, resilient means associated with said hinged connections resisting the bending in the direction opposite to the direction of rotation, said resilient means being progressively stronger along said series toward said hub.

23. In combination, a hub unit rotatable about an axis, a wing comprising a series of elements pivotally connected together on axes substantially parallel to said axis whereby the wing is capable of being wound into a coil of compact compass, and a drum member rotatable on first said axis, the wing being secured to the drum, said wing being held in extended position during operation by centrifugal force.

24. In combination, a wing capable of being wound into a coil for compact storage, a rotating hub unit, a drum on said unit on which the wing may be wound, means for rotating said drum, and means independent of last said means for locking the drum to an intermediate part of the wing with the wing partly extended.

25. In an aircraft, a central hub, a plurality of air foils extending outwardly in a generally radial direction from said central hub around which they rotate, said air foils being capable of being rolled into a coil for compact storage, control means comprising adjustable means whereby the inner end of said wing is attached to said central hub for varying the angle of the chords of said air foils relative to said central axis by torsionally flexing said air foils, and means external of the airfoil for resisting twisting thereof.

26. In an aircraft, a central hub, a plurality of air foils extending outwardly in a generally radial direction from said central hub around which they rotate, said air foils being capable of being rolled into a coil for compact storage, control means comprising adjustable means whereby the inner end of said wing is attached to said central hub for changing the angle of the chords of said air foils relative to said central axis during rotation, and means in addition to the airfoil structure for resisting twisting of the airfoils.

27. In an aircraft, a flexible wing, a horizontal drum to which said wing is secured and upon which said wing may be rolled into a coil for compact storage, means for rotating said drum about a vertical axis whereby the wing is held extended by centrifugal force, and means for rotating opposite ends of said drum in opposite directions to change the angle of the chord of said wing relative to the axis of said drum.

28. In an aircraft, a rotating wing system mounted thereon, a plurality of drums forming a part of said system, an air foil section wing flexible in at least one direction attached to each of said drums, means for preventing twisting of the wings, and means for similarly revolving each drum with respect to the wing thereto attached so that each wing is wound up upon its respective drum for compact storage and for maintaining said wings at a partly unwound position, comprising a worm gear carried by each drum and a common worm meshing with the worm gear on each drum whereby all the drums may be driven irreversibly and simultaneously in either direction.

29. In an aircraft, a plurality of air foils extending outward in a generally radial direction from a central member with which they rotate, each said air foil comprising a series of rigid sections hingedly connected together on axes transverse to the longitudinal axis of the air foil, and means for winding said air foils into a coil by bending them relatively at said hinged connections for compact storage.

30. In a rotating wing structure for aircraft, a wing flexible in at least one direction adapted to rotate about an axis from which it extends radially, and a drum with an axis coaxial with first said axis upon which the wing may be rolled as a coil.

31. In a rotating wing structure for aircraft, a wing flexible in at least one direction adapted to rotate about a generally vertical axis from which it extends radially, the chord of the wing being generally horizontally in operation, and a generally vertical drum upon which said wing may be rolled up as a coil.

32. In a rotating wing structure for aircraft, a pair of wings flexible in at least one direction adapted to rotate about an axis from which they extend radially, and a single drum upon which both wings may be wound.

33. In an aircraft, a wing flexible in at least one direction, a horizontal drum to which said wing is secured and upon which said wing may be rolled into a coil for compact storage, means for rotating said drum about a vertical axis whereby the wing is held extended by centrifugal force, and drum actuating means for rotating opposite ends of said drum in opposite directions to change the angle of the chord of said wing relative to the axis of said drum and for rotating the whole drum to wind up the wing thereon.

34. In an aircraft, a drum mounted thereon with its axis substantially vertical, a plurality of air foil section wings flexible in at least one direction attached to the drum, means for rotating said drum around its axis to rotate said wings as a rotating wing system, and means for causing said wings to roll up on said drum.

35. In an aircraft, a drum mounted thereon with its axis substantially vertical, a plurality of air foil section wings attached to the drum, each of said wings being rigid in all directions but one, means for rotating said drum around its axis to rotate said wings as a rotating wing system, and means for causing said wings to roll up on said drum.

36. In an aircraft, a drum mounted thereon with its axis substantially vertical, an air foil section wing attached to the drum, said wing being rigid in all directions but one, means for rotating said drum around its axis to rotate said wing as a rotating wing system, and means for causing said wing to roll up on said drum.

37. A rotating air foil system having a blade of airfoil section flexible in at least one direction, means permanently located adjacent the axis of rotation of said rotating air foil system for winding said blade into a coil in a direction of flexibility around its inner end, and weight means external to and forward of said airfoil section for preventing excessive torsional bending around an axis in the general longitudinal direction of the blade when extended.

38. In a rotating air foil system, bearing means defining an axis of rotation, an air foil blade of stable section bendable in at least one direction revolving around said axis of rotation, drum means revolvable about an axis, and means for causing said blade to wind around said drum for compact storage, said drum axis being generally parallel to said axis of rotation.

39. In a rotating air foil system, bearing means defining an axis of rotation, an air foil blade of stable section bendable in at least one direction revolving around said axis of rotation, drum means revolvable abount an axis, and means for causing said blade to wind around said drum for compact storage, said drum axis being generally coincident with said axis of rotation.

40. In a rotating air foil system, bearing means defining an axis of rotation, an air foil blade revolving around said axis, said blade comprising a plurality of rigid sections connected together by hinged joints, and revolvable drum means around which said blade may be wound for storage, the axis of said hinge joints and said drum means being generally parallel to said axis of rotation.

41. In an aircraft, a rotating wing comprising a series of rigid sections hinged together to permit flexing in one direction only, mounting means whereby said wing is mounted on the aircraft, and power means for flexing adjacent sections whereby the wing is compacted into small compass.

THEODORE THEODORSEN.
EDWARD F. ANDREWS